(12) United States Patent
Bailly et al.

(10) Patent No.: US 8,903,570 B2
(45) Date of Patent: Dec. 2, 2014

(54) STANDBY INSTRUMENT FOR AN AIRCRAFT, THE INSTRUMENT PROVIDING FLIGHT INFORMATION, POWER MARGIN INFORMATION, AND ASSISTANCE IN PILOTING

(71) Applicant: Airbus Helicopters, Marignane, Cedex (FR)

(72) Inventors: Stephane Bailly, Cabries (FR); Serge Germanetti, Marseilles (FR); Marc Salesse-Lavergne, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/865,473

(22) Filed: Apr. 18, 2013

(65) Prior Publication Data

US 2013/0282205 A1 Oct. 24, 2013

(30) Foreign Application Priority Data

Apr. 20, 2012 (FR) .................................... 12 01164

(51) Int. Cl.
*G01C 23/00* (2006.01)
*B64D 43/00* (2006.01)
*G05D 1/00* (2006.01)
*B64C 19/00* (2006.01)
*G05D 1/08* (2006.01)

(52) U.S. Cl.
CPC ................ *B64C 19/00* (2013.01); *B64D 43/00* (2013.01); *G05D 1/0077* (2013.01); *G01C 23/00* (2013.01); *G05D 1/0858* (2013.01)
USPC .......................................................... 701/3

(58) Field of Classification Search
CPC ........ B64C 17/00; G01C 21/16; G01C 23/00; G01C 23/005
USPC .............................................................. 701/3
See application file for complete search history.

(56) References Cited

U.S. PATENT DOCUMENTS

| 3,752,420 A | 8/1973 | Osder |
| 5,915,273 A | 6/1999 | Germanetti |

(Continued)

FOREIGN PATENT DOCUMENTS

| EP | 0816226 A1 | 1/1998 |
| EP | 1482277 A1 | 12/2004 |
| EP | 1884816 A2 | 2/2008 |
| EP | 2301844 A1 | 3/2011 |
| FR | 2749545 A1 | 12/1997 |

(Continued)

OTHER PUBLICATIONS

Search Report and Written Opinion; Application No. FR 1201164; dated Feb. 27, 2013.

*Primary Examiner* — James Trammell
*Assistant Examiner* — Michael D Lang
(74) *Attorney, Agent, or Firm* — Brooks Kushman P.C.

(57) ABSTRACT

A standby instrument (10) for an aircraft, the instrument comprising at least one inertial sensor (1), at least one pressure sensor (2), calculation means (3) connected to said inertial and pressure sensors (1, 2), a display unit (4). Said calculation means (3) are suitable for determining critical flight information for said aircraft, and for displaying said critical flight information on the display unit (4) in the event of a main information system of said aircraft failing. In addition, said standby instrument (10) also incorporates stabilization relationships enabling said calculation means (3) to determine control relationships in order to control the actuators (15) of an autopilot of said aircraft in the event of said autopilot failing. Finally, said calculation means (3) are connected to at least one engine operation computer (5) enabling said instrument (10) to display information about a first limit of the engine on said display unit (4).

15 Claims, 1 Drawing Sheet

(56) References Cited

U.S. PATENT DOCUMENTS

| | | |
|---|---|---|
| 6,195,598 B1 | 2/2001 | Bosqui |
| 6,564,628 B1 | 5/2003 | Leblond |
| 7,415,330 B2 | 8/2008 | Saint Aroman |
| 8,412,388 B2 | 4/2013 | Chaniot |
| 2007/0164166 A1 | 7/2007 | Hirovan |
| 2008/0012730 A1 | 1/2008 | Soler |
| 2010/0286850 A1* | 11/2010 | Collot et al. ............ 701/7 |

FOREIGN PATENT DOCUMENTS

| | | |
|---|---|---|
| FR | 2756256 A1 | 5/1998 |
| FR | 2784457 A1 | 4/2000 |
| FR | 2855303 A1 | 11/2004 |
| FR | 2903787 A1 | 1/2008 |
| FR | 2919066 A1 | 1/2009 |
| FR | 2924213 A1 | 5/2009 |
| WO | 2009010510 A2 | 1/2009 |

* cited by examiner

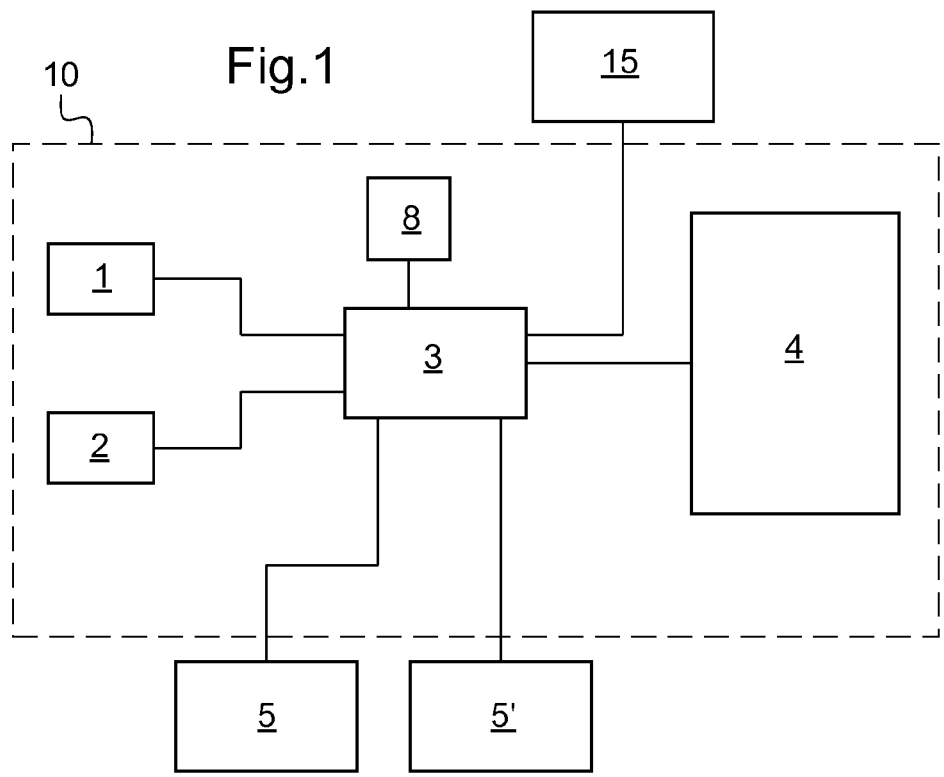
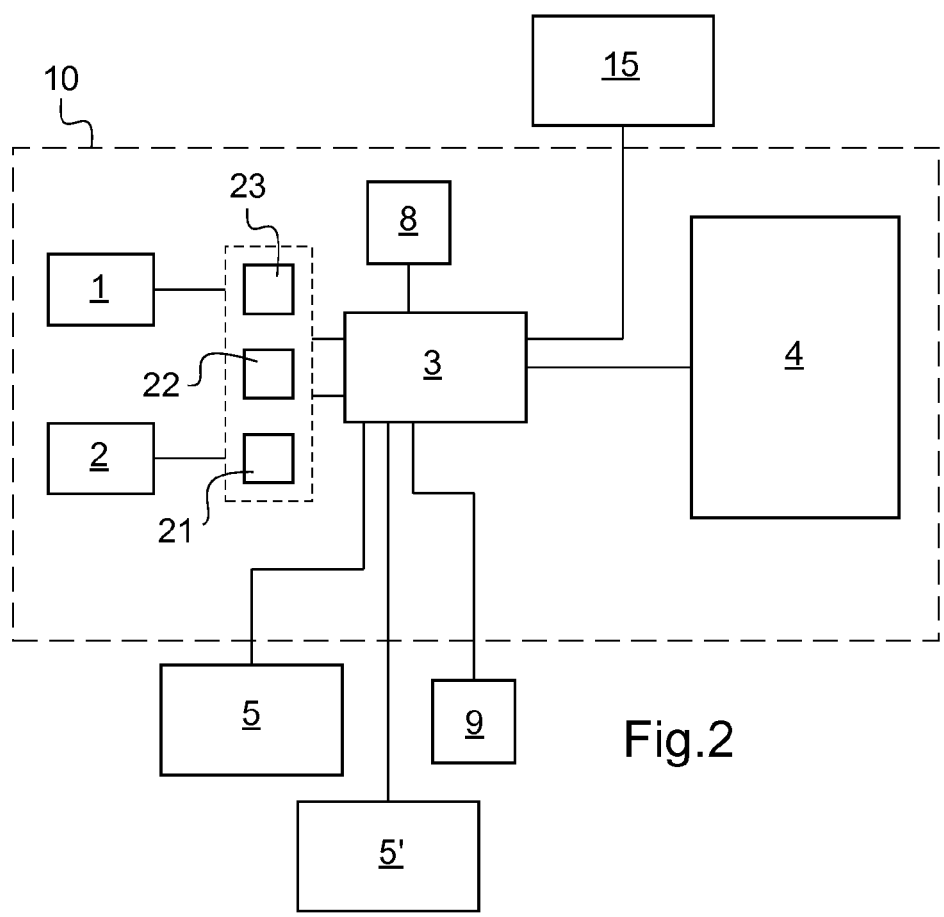

STANDBY INSTRUMENT FOR AN AIRCRAFT, THE INSTRUMENT PROVIDING FLIGHT INFORMATION, POWER MARGIN INFORMATION, AND ASSISTANCE IN PILOTING

CROSS REFERENCE TO RELATED APPLICATIONS

This application claims priority to French patent application No. FR 12 01164 filed on Apr. 20, 2012, the disclosure of which is incorporated in its entirety by reference herein.

BACKGROUND OF THE INVENTION (1) Field of the Invention

The present invention lies in the technical field of standby instruments for piloting an aircraft. The present invention relates to a standby instrument that combines several types of function, i.e. it supplies flight information, power or torque margin information, and it also provides piloting assistance. The standby instrument is more particularly for use on a rotary wing aircraft. The invention also provides a method of operating the standby instrument.

(2) Description of Related Art

In the event of a main information system failing, a standby instrument acts to take its place and to provide the pilot with information that is essential and considered as being critical in terms of flight safety. The pilot can thus continue to pilot the aircraft in complete safety in spite of the failure of the main information system. The critical information generally provided by the standby instrument relates to the forward speed of the aircraft, its altitude, its attitudes, and also its heading. The term "attitudes" should be understood as meaning its Euler angles in roll and in pitching.

Such a standby instrument incorporates all of the resources it needs, in particular one or more inertial and pressure sensors together with one or more display units, conventionally a screen. The standby instrument is independent of the main information system. Such a standby instrument is commonly referred to as an integrated standby instrument system (ISIS) or as an integrated electronic standby instrument (IESI).

In the event of a failure of a main piloting assistance device, another instrument can take its place and provide the pilot with partial assistance, mainly short-term stabilization concerning angular speeds in roll, pitching, and yaw. This short-term stabilization is intended to counter the aircraft beginning to present angular speeds in the form of drift or oscillation about the roll, pitching, and yaw axes. Such an instrument incorporates an inertial sensor of the gyroscopic type, and calculation means for determining the control relationships for stabilizing the aircraft in this way.

Certain aircraft may also include a device that provides information about the management of the power of their engines. Such a device generally provides a first utilization limit for the engine(s) above which the pilot can use the aircraft for a limited length of time only, and it provides an engine utilization margin that corresponds to the power or torque margin that is available relative to said limit. By way of example, such devices are described in documents FR 2 749 545 and FR 2 756 256. Such an instrument is referred to as a first limitation instrument. This power or torque limitation is a function simultaneously of operating parameters of the engine(s) and of flight conditions.

In the event of a failure of said first limitation instrument, certain rotary wing aircraft make use of marking on the collective pitch control. This marking indicates a safe zone to the pilot, i.e. a zone in which the pilot can operate without running the risk of exceeding the utilization limit of the engine(s) of the aircraft. However, under such circumstances the pilot has no realistic idea about the power or torque margin at the engine(s) that is available as a function of various flight conditions.

On principle, in order to satisfy constraints imposed by regulations concerning any critical piloting function for the aircraft, a standby instrument must guarantee independence from the corresponding main instrument and thus mitigate any errors of design or production that might be shared in common. Having a standby instrument that is independent guarantees that the failure of the main system will not affect this standby instrument directly. The term "failure" is used to designate any behavior that does not comply with expectations for its function. Dissimilarity, which consists in using components in the standby instrument that are different from the components making up the main system, serves to reduce the risk of a failure that affects the main system also affecting the standby instrument, and thus contributes to this independence of the standby instrument relative to the main instrument. By way of example, these differences may be sensors that make use of a different technical solution, or calculation means that have a different architecture.

These various standby instruments that perform various functions can be found nowadays on a single aircraft, but they remain completely independent of one another. Each system has its own sensors and one or more specific calculation means.

Document U.S. Pat. No. 3,752,420 describes a system used in an autopilot in order to stabilize the behavior of the aircraft, in particular relative to the pitching movement of the aircraft. That system makes use of information coming from two different inertial sensors that provide information about position and speed about the pitching axis. The system filters this information and then delivers a signal that makes it possible in particular to stabilize the aircraft by means of the autopilot. That system is also capable of detecting an error in the information delivered by one of the sensors, in which case it adapts the piloting relationship of the autopilot in order to conserve stable behavior for the aircraft.

Document FR 2 784 457 describes standby instruments having pressure and inertial sensors, and also electronic measurement systems and calculation means. The standby instruments are thus capable, in the event of a failure a main information system, of providing critical information to the pilot, i.e. the forward speed of the aircraft, its altitude, and its attitudes, while incorporating corrections in order to improve the accuracy of that information. In particular, on the basis of the information from the sensors, that system is capable of determining the aerodynamic angle of attack of the aircraft and its Mach number, and it is capable of deducing therefrom a correction factor that then serves to improve the accuracy of the critical information.

In addition, document FR 2 855 303 describes a standby display device that is capable, in the event of a failure of the main display device, of supplying various kinds of information as selected by the pilot. Three configurations are possible. In a first configuration, only piloting information such as forward speed of the aircraft, its altitude, and its attitudes is displayed on a screen. In a second configuration, only navigation information such as the heading of the aircraft and its position relative to a theoretical route is delivered to the pilot. Finally, in a third configuration, the screen displays both piloting information and navigation information.

Also known is document FR 2 903 787, which describes a standby device that acts in the event of a failure of a main device to deliver critical information about forward speed, altitude, and attitudes to the pilot of the aircraft. That device conventionally incorporates inertial and pressure measurement sensors together with calculation means and display means. The particular feature of that device lies in its display mode, which forms part of a so-called "head-up" viewing system.

Furthermore, document FR 2 919 066 describes a standby instrument that acts, in the event of a failure of a main device, to deliver critical information about forward speed, altitude, and attitudes to the pilot of the aircraft. That standby instrument conventionally incorporates inertial and pressure measurement sensors together with calculation means and display means. Once more, the display mode used is a head-up viewing system, but the particular feature of that instrument lies in displaying a speed vector of the aircraft. The calculation means are capable of determining the speed vector solely on the basis of the information from the inertial and pressure measurement sensors.

Also known is document US 2007/164166, which describes a standby instrument capable of taking the place of a primary flight control instrument of an aircraft. That standby instrument includes in particular one or more sensors, calculation means, and information transmission means. In addition, that standby instrument is connected to the flight actuators of the aircraft. In the event of a failure of the primary flight control instrument, the standby instrument serves to control those flight actuators and thus enables the aircraft to continue its flight safely.

Document FR 2 924 213 describes a standby instrument including sensors, means for processing measurements from the sensors, radio communication management means, and a display screen. That standby instrument can thus display both primary and flight critical information and also radio communication and/or radio navigation data.

Finally, document EP 2 301 844 describes a piloting assistance method and device for an aircraft having at least two engines. In the event of a failure of a first limitation indicator, that piloting assistance method and device serve to maintain each engine-monitoring parameter below a predetermined threshold.

BRIEF SUMMARY OF THE INVENTION

An object of the present invention is thus to provide a standby instrument that combines, within a single instrument, the delivery of various kinds of information: both critical or important flight information needed by the pilot; and also limitation information concerning the power or the torque that can be delivered by the engines of the aircraft. The standby instrument also delivers piloting assistance in the event of a failure of the autopilot.

The invention provides a standby instrument for an aircraft, the instrument comprising at least one inertial sensor, and at least one pressure sensor together with calculation means connected to the inertial and pressure sensors. The calculation means are capable of responding to measurements from the inertial and pressure sensors to determine critical flight information for the aircraft, i.e. the forward speed of the aircraft, its altitude, and its attitudes.

The standby instrument also includes a memory connected to the calculation means and a display unit capable of displaying the critical flight information in the event of a failure of a main information system of the aircraft, thus enabling the pilot to continue piloting the aircraft in complete safety.

According to the invention, the standby instrument incorporates a piloting assistance device acting via actuators of the autopilot of the aircraft.

The standby instrument is remarkable in that, by combining the forward speed and attitudes information with stabilization relationships present in the memory of the standby instrument, it is capable of determining control relationships in order to control the actuators of the autopilot directly in the event of a failure of the computer(s) of the autopilot.

The calculation means of the standby instrument determine the forward speed of the aircraft and its attitudes from the measurements provided by the inertial and pressure sensors. By introducing this air speed, angular speed, and attitudes information into the stabilization relationships present in the memory of the standby instrument, the calculation means are capable of determining the control relationships for supplying to the actuators of the autopilot in order to stabilize the aircraft in straight line flight and also when turning.

The stabilization relationships are mathematical functions associating one or more inputs of the calculation means with one or more control relationships for the actuators connected to the outputs thereof. Usually, i.e. in a situation in which disturbances are of small amplitude, such a mathematical relationship demonstrates behavior that is linear and that is thus capable of being characterized completely by a transfer function in the frequency domain.

Behavior that is "linear" means that if the mathematical function transforms an input u as a function of time, written u(t), to obtain an output x, which is likewise a function of time and written x(t), and if it transforms an input v as a function of time written v(t) into an output y, that is likewise a function of time and written y(t), then any linear combination of the inputs u and v, expressed in the general form a.u(t)+b.v(t) is transformed into the linear combination of the output a.x(t)+b.y(t), where a and b are constant coefficients.

In contrast, a sinusoidal input having a given frequency is transformed by a linear mathematical relationship into a sinusoidal output having the same frequency, but with an amplitude and phase shift ratio between the two sinewaves that is variable depending on the frequency. The complex function describing this amplitude and phase shift ratio over the entire frequency range is referred to herein as a "transfer" function. Thus, any stabilization relationship may be associated with a transfer function.

Since the calculation means have an output that can be connected to the actuators of the autopilot, they can control those actuators in application of determined control relationships.

The standby instrument then makes it possible to provide stabilization in pitching, roll, and yaw of the aircraft in spite of the failure of the autopilot computer(s).

The calculation means also have at least one input connected to at least one engine computer present in the aircraft. This type of engine computer is generally referred to as full authority digital engine control (FADEC) and is present on numerous types of aircraft in order to control the operation of one or more turbine engines. The term FADEC is used below in the present description to designate such an engine computer.

While taking account of flight conditions and responding to various kinds of information derived from the operation of the engine(s) of the aircraft and from their environment, the FADEC calculates a first utilization limit for the engine(s) together with an available power or torque margin relative to the first utilization limit. In normal operation, a first limitation instrument informs the pilot via a display screen about the value of this first utilization limit and of the power or torque margin that is available relative to said first limit.

It should be observed that determining this first utilization limit and the corresponding power or torque margin can be performed in application of known methods. By way of example, reference may be made in particular to documents FR 2 749 545 and FR 2 756 256.

The standby instrument is then capable, via the FADEC, of displaying information about the first utilization limit of the engine(s) in the event of a failure of the first limitation instrument, and it is capable of displaying that information on the display unit of the standby instrument.

The FADEC calculates this first utilization limit and the corresponding available power or torque margin and then delivers that information to the calculation means which can then display it on the display unit.

In an embodiment of the invention, the FADEC delivers information about the operation of one or more aircraft engines and about their environment to the calculation means of the standby instrument. Thereafter, these calculation means use a dedicated algorithm present in the memory of the standby instrument to determine the first utilization limit and the corresponding available power or torque margin.

As a result, the pilot is informed via the display unit of the standby instrument, and in spite of the failure of the main information system, simultaneously of critical flight information and of the utilization margin of the engine(s) that corresponds to the power or torque margin available from the engine(s) relative to the first utilization limit. The pilot can then maneuver the aircraft in complete safety.

Such a standby instrument of the invention thus significantly improves flight safety in the event of a failure of one or more instruments. In particular, such a standby instrument can act in the event of a failure to take the place of the main information system of the aircraft, the place of its autopilot, and/or the place of its first utilization instrument, where those three instruments are distinct.

On the display unit, the pilot can see not only the critical flight information, but also the first utilization limit of the aircraft engine(s) and the available power or torque margin. This information enables the pilot to avoid exceeding that limit or at least to exceed it knowingly. The pilot can thus restrict exceeding the limit to a short length of time in compliance with the requirements of the aircraft.

If this utilization limit is exceeded for too long a period, that will lead at the very least to additional maintenance operations, and possibly to the engine(s) being damaged. Either way, that leads to additional costs for maintenance of the aircraft.

In contrast, with a traditional standby instrument, the pilot must continuously and personally estimate the available power or torque margin as a function of flight conditions, whether or not the aircraft has marking on the collective pitch indicating a safe zone. Part of the pilot's attention is thus devoted to estimating this power or torque margin to the detriment of devoting attention to the flight itself.

Furthermore, the aircraft continues to have behavior that is stable in spite of the failure of the autopilot because of the stabilization function that is incorporated in the standby instrument.

The standby instrument of the invention combines providing the pilot with critical flight information, information about the first limitation of the engine(s), and information about the available power or torque margin, while also performing the function of stabilizing the aircraft in attitudes and in yaw. The instrument thus constitutes a complete unit incorporating those functions that are essential for the safety of the aircraft.

Grouping these functions together in a single instrument then makes the instrument easier to incorporate in the cockpit of the aircraft. Likewise, it is more ergonomic to use, since the pilot finds all of the necessary information within a single instrument.

Furthermore, the resources of this standby instrument, whether in terms of sensors or in terms of calculation means, are shared between the three functions, thus minimizing not only their costs, but also their weight and the space they occupy in the cockpit of the aircraft.

Finally, the standby instrument is entirely independent of the main instrument of the aircraft. Its dissimilarity relative to those main instruments is also ensured by making use of sensors, calculation means, and a display unit that are different from those of the main instruments.

The device may also include one or more additional characteristics.

In a variant of the invention, the calculation means are capable of providing the averages of the angular speeds in pitching and in coordinated turning yaw of the aircraft.

Relying on the measurements performed by the inertial and pressure sensors contained in the standby instrument, the calculation means are capable, as mentioned above, of determining the forward speed of the aircraft and its attitudes.

More precisely, the calculation means are capable of determining:

the longitudinal component U of the forward speed of the aircraft;
the lateral component V of the air speed;
the vertical component W of the air speed;
the angular speed in roll p;
the angular speed in pitching q;
the angular speed in yaw r; and
the roll attitude $\phi$; and
the pitching attitude $\theta$.

The calculation means include instructions enabling the average angular speeds to be determined in roll, in pitching, and in coordinated turning yaw on the basis of that data.

Under such conditions, the following equation is known for the derivative of the attitude in roll:

$$\dot{\phi} = p + \tan\theta \cdot (q\sin\phi + r\cos\phi)$$

During a coordinated turn, this derivative is zero. The average angular speed in roll $p_{Avr}$ can be deduced therefrom when $\dot{\phi}=0$:

$$p_{Avr} = -\tan\theta \cdot (q\sin\phi + r\cos\phi)$$

Also known is the equation for the derivative of the lateral component V of the air speed:

$$\dot{V} = -rU + pW + g \cdot (N_y + \cos\theta\sin\phi)$$

where $N_y$ is the lateral load factor and g is the acceleration due to gravity.

A turn is said to be "coordinated" when it is performed without any lateral load factor ($N_y=0$) and without any slide slip ($\dot{V}=0$). This produces:

$$0 = -rU + pW + g \cdot \cos\theta\sin\phi$$

In addition, in a coordinated turn, p and W have small values so their product pW can be ignored and $\cos\theta$ can be approximated by 1 since $\theta$ is small. The average angular speed in yaw can be deduced therefrom:

$$r_{Avr} = \frac{g}{U}\sin\varphi$$

Also known is the equation for the derivative of the attitude in pitching:

$$\dot{\theta} = q\cos\phi - r\sin\phi$$

In a coordinated turn, this derivative is zero. The average angular velocity in pitching $q_{Avr}$ can be deduced therefrom when $\dot{\theta}=0$:

$$q_{Avr} = r\tan\phi$$

In a coordinated turn, r may be replaced by its average, i.e.:

$$r_{Avr} = \frac{g}{U}\sin\varphi$$

This gives:

$$q_{Avr} = \frac{g}{U}\sin\varphi\tan\varphi$$

Finally, the following equations are obtained that determine the averages of the angular speeds in roll, pitching, and coordinated turn yaw:

$$p_{Avr} = -\tan\theta \cdot (q\sin\varphi + r\cos\varphi)$$
$$r_{Avr} = \frac{g}{U}\sin\varphi$$
$$q_{Avr} = \frac{g}{U}\sin\varphi\tan\varphi$$

These average angular speeds in coordinated turning are then determined and taken into account by the calculation means by respective subtractions from the current values of the angular speeds to make it possible, on the basis of the stabilization relationships incorporated in the memory of the standby instrument, to establish the stabilization control relationships for the actuators of the autopilot. Introducing these average angular speeds into the procedure for establishing the control relationships serves to reinforce the resulting stabilizing effect.

By taking account of these average angular speeds, it becomes possible to select a stabilization function having a transfer function, as mentioned above, that presents a modulus that is large at low frequency. This modulus, also referred to by the term "gain", thus serves to improve the effectiveness and the reactivity of the control relationships in countering any tendency of the aircraft to drift.

Furthermore, without these average angular speeds being taken into account, each new turn would give rise to the appearance of a non-zero average angular speed. With a large modulus at such low frequencies, the control relationship would tend to oppose this average value, thereby causing the aircraft to react against the pilot's intention.

Once more, this improvement in the stabilization of the aircraft is obtained without modifying the standby instrument, i.e. without affecting its weight or its size, since the resources that already exist in the standby instrument suffice.

In order to determine these average values, instructions corresponding to the above-defined equations are stored in the memory of the standby instrument.

In an embodiment of the invention, the standby instrument includes at least one filter block. The filter block serves essentially to filter the information from the inertial or pressure sensors, e.g. for the purpose of eliminating certain frequencies from those measurements or of attenuating the effect of external disturbances on those measurements.

For example, the standby instrument includes a series of notch filters that enables disturbances due to the rotation of the main rotor of the aircraft to be eliminated, in particular disturbances at high frequencies. Vibrations corresponding to frequencies that are harmonics of the frequency of rotation of the rotor are picked up by the inertial sensors of the standby instrument, and they would therefore run the risk of being propagated to the commands applied to the actuators of the autopilot if they were not filtered out.

A notch filter, which may also be referred to as a band stop filter or a band rejection filter, is a filter that prevents a range of frequencies from passing.

In addition to this series of notch filters for eliminating frequencies known to be disturbed by the vibration coming from the rotation of the main rotor, there is also a danger of noise and high frequency disturbances being measured. These can be filtered out by means of a lowpass filter, since they occupy a frequency band that extends towards high frequencies.

A lowpass filter is a filter that passes low frequencies, i.e. frequencies below a so-called "cut-off" frequency and that attenuates or eliminates high frequencies, i.e. frequencies higher than the cut-off frequency.

By means of these filters, the measurements from the inertial and pressure sensors can be used without fear of excessive measurement noise or undesirable vibrations propagating.

Downstream from these filters, the stabilization relationship itself differs potentially relative to each axis for each type of aircraft that imposes its own transfer function. In order to be able to adapt to different aircraft, it is therefore necessary to provide filters that are general in structure and that are easily configurable.

Each filter block may thus be made of a plurality of types of filter, e.g. a lowpass filter together with a plurality of notch filters, or indeed it may contain filters of general structure. Furthermore, different filter blocks may be applied to the set of measurements from the inertial or pressure sensors or indeed to a specific measurement, such as the measurement of the angular speed in yaw, for example.

Once filtered, the data input to the standby instrument can then be either sent to other systems that are connected to the standby instrument, or else used, e.g. by the calculation means of the standby instrument, for application to a stabilization relationship without undesirable components such as frequencies associated with the rotation of the main rotor appearing in those calculated control relationships.

In another embodiment of the invention, the standby instrument incorporates configurable software. The filter blocks contained in the standby instrument need to be adapted for each aircraft.

Thus, each filter contained in the filter blocks is defined by one or more characteristics, e.g. enabling the passband allowed by the filter or the width of the passband to be modified. Such configurable software is then capable of modifying those characteristics depending on the aircraft on which the standby instrument is installed.

For this purpose, the standby instrument incorporates settings files, each file corresponding to a type of aircraft. The characteristics for applying to the various filters are thus incorporated in the settings files for the corresponding aircraft.

Furthermore, the structure of the stabilization relationship is common to all aircraft, but coefficients that are specific to each aircraft on which the standby instrument might be used need to be applied to those stabilization relationships in order to adapt each of them to the transfer functions of the aircraft. The settings files also incorporate these coefficients for the stabilization relationships.

The configurable software and the settings file are stored in the memory of the standby instrument. As a result, the standby instrument automatically adapts the coefficients of the stabilization relationships and the characteristics of the various filters contained in the filter blocks to the aircraft on which the standby instrument is installed.

Consequently, a single standby instrument can be used on different aircraft, thus enabling the cost of the instrument to be reduced, not only in terms of its fabrication, but also in terms of its maintenance and in terms of managing spare parts.

In addition, the standby instrument can be adapted very simply to a new aircraft or to modifications on an existing aircraft. It suffices to load the settings file that corresponds to the new aircraft into the memory of the standby instrument.

In a preferred embodiment of the invention, the calculation means comprise two calculation modules. A first calculation module begins during a first cycle to determine the characteristics to be applied to the various filters making up the filter blocks and the coefficients to be applied to the stabilization relationships. Thereafter, during each following cycle, a second calculation module determines the stabilization control relationship controlling the actuators of the autopilot. This configuration thus serves to lighten the calculation load on each cycle.

In this preferred embodiment, the standby instrument has three filter blocks, a first filter block for attenuating effects that are common to all of the sensors, such as those due to the rotation of the main rotor, a second filter block for filtering resonant modes specific to each of the roll, pitching, and yaw axes, and a third filter block for filtering the angular speeds specific to calculating the piloting control relationship for each axis.

During a first cycle after the standby instrument is switched on, the first calculation module determines the characteristics to be applied to the various filters and the coefficients to be applied to the stabilization relationships incorporated in the standby instrument as a function of the aircraft on which the standby instrument is installed. For this purpose, the calculation means use the configurable software contained in the memory of the standby instrument in association with the settings file corresponding to the aircraft.

Thereafter, during each following cycle, the standby instrument calls on a second calculation module to make available at all times control relationships that are applicable to the actuators, following a possible failure of the computer(s) of the autopilot.

To do this, the measurements from the inertial and pressure sensors are initially filtered by the filter blocks in which the various filters are given determined characteristics during the first cycle. Thereafter, the average angular speeds about the roll, pitching, and yaw axes are determined using the instructions present in the memory of the standby instrument. Finally, the control relationships for stabilizing the aircraft are determined from the stabilization relationships that are also stored in the memory of the standby instrument.

In another embodiment, the standby instrument serves to determine the frequency of rotation of the main rotor. It is mentioned above that the filter blocks are capable of eliminating from a given measurement the effect of the vibrations generated by the rotation of the main rotor of the aircraft. Conversely, it is also possible to isolate those vibrations and to make use of them in order to determine the frequency of rotation of the main rotor.

The rotation of the main rotor inevitably gives rise to vibration that propagates throughout the aircraft and that is measured by any inertial sensor, regardless of whether it operates by measuring angular velocity or load factor, for example. These measurements thus include a frequency at the frequency of rotation of the rotor and also at each of its main harmonics. This rotation of the main rotor also gives rise to dynamic pressure variations each time a blade passes over the pressure sensors. It is thus possible using the calculation means available in the standby instrument to analyze all of the available measurements and to extract from the most pertinent of them the frequency of rotation of the main rotor. This information can then be displayed on the display unit of the standby instrument and seen by the pilot.

In a first implementation of this estimate of the frequency of rotation of the main rotor, a fast Fourier transform (FFT) on a moving window can be applied to the measurement or to a combination of the most pertinent measurements. However, in order to obtain good frequency resolution, it is necessary to use a time window having a large number of points, and that has the consequence of a delay in the measurement and a requirement for large calculation capacity.

In a second implementation of this estimate of the frequency of rotation of the main rotor, a first bandpass filter can begin by isolating the frequency band in which the rotation of the main rotor is likely to vary, and then detect the succession of peaks in the signal from the filter. The duration between two positive peaks or between two negative peaks, or more generally a weighted average of the duration between the positive peaks and the duration between the negative peaks as recently detected can be used to estimate the period of rotation of the rotor, and, on being inverted, to determine its frequency. However, in order to avoid interfering peaks that might falsify the estimate, it is necessary to increase the selectivity of the filter and thus to lengthen its response time in the event of the frequency of rotation varying. Furthermore, in order to stabilize the result of the estimate, it is necessary either to take an average over a large enough number of raw periods, or else to perform lowpass filtering on the raw periods, which either way leads to introducing an undesirable delay in obtaining the estimate.

In a third implementation of this estimate of the frequency of rotation of the main rotor, a first lowpass filter may initially isolate the frequency band in which the rotation of the main rotor is likely to vary, and a phase locked loop (PLL) demodulation mechanism may be applied so as to cause a sinewave generated by the calculation means to coincide with the main component of the signal from the first bandpass filter. This technique which is usually restricted to demodulating radio frequency signals, presents the advantage of being robust in the face of measurement noise and of detecting interfering vibrations, has the ability to track variations in the frequency of the rotor at the cost of a delay that is acceptable, and it presents simplicity of implementation that avoids overloading the calculation capacity of the standby instrument. This estimate is made by performing the following steps:

1) calculating the combination of measurements that provide the best representation of the variation that is associated with the frequency of rotation of the main rotor;

2) lowpass filtering the result of the above-mentioned combination of measurements. The selectivity of this filter is selected using an optimization criterion. The lower the selectivity, the smaller the passband that needs to be used for the phase locked tracking loop, and the greater the selectivity of this filter, the greater the passband that needs to be used for the tracking loop;

3) lowpass filtering of the absolute value of the signal from the bandpass filter with this signal being divided by its filtered absolute value so as to normalize it, i.e. so as to avoid fluctuations in the amplitude of its envelope. This normalized signal thus has the form:

$$A \cos(\omega t + \phi) + \epsilon$$

where the modulus A is caused to vary little by the normalization and where $\epsilon$ represents interfering noise;

4) calculating two sinewaves in quadrature $$\sin(\omega_0 t) \text{ and } \cos(\omega_0 t)$$

at a frequency $f_0$ such that $$\omega_0 = 2\pi f_0$$

as determined by the above-described loop;

5) multiply each of these sinewaves by the normalized signal so as to obtain a first signal proportional to S1 given by:

$$S1 = \sin[(\omega + \omega_0)t + \phi] - \sin[(\omega - \omega_0)t + \phi]$$

and a second signal proportional to S2 given by:

$$S2 = \cos[(\omega + \omega_0)t + \phi] + \cos[(\omega - \omega_0)t + \phi]$$

6) calculating the derivative of each of the two signals S1 and S2:

$$S1' = (\omega + \omega_0) \cdot \cos[(\omega + \omega_0)t + \phi] - (\omega - \omega_0) \cdot \cos[(\omega - \omega_0)t + \phi]$$

and $$S2' = -(\omega + \omega_0) \cdot \sin[(\omega + \omega_0)t + \phi] - (\omega - \omega_0) \cdot \sin[(\omega - \omega_0)t + \phi]$$

7) extracting the low frequency components from the signals S1, S2, S1', and S2' by lowpass filtering, so as to give the following signals respectively Lps1, LpS2, LpS1', and LpS2';

8) recombining these four signals using the following formula:

$$LpS1 \times LpS2' - LpS2 \times LpS1'$$

in order to obtain the following signal:

$$(\omega - \omega_0) \cdot \sin^2[(\omega - \omega_0)t + \phi] + (\omega - \omega_0) \cdot \cos^2[(\omega - \omega_0)t + \phi] + HF$$

where HF designates the high frequency terms. This signal thus has a term in $(\omega - \omega_0)$ and high frequency terms; and 9) applying an appropriate gain to the signal from this recombination, and integrating in order to obtain $f_0$. This integration acts as a lowpass filter that eliminates the high frequency component. The complete loop amounts to calculating a difference $(\omega - \omega_0)$ followed by applying a gain and pure integration, which constitutes the conventional scheme for a first order lowpass loop.

In another embodiment of the invention, the standby instrument is connected to at least one localization device, that serves to determine a departure of the aircraft from a predetermined path that the aircraft is to follow.

It is advantageous to deliver information to the pilot about this departure from a predetermined path for the aircraft, even in the event of the main display system failing. For this purpose, a localization device may be connected to the standby instrument. By way of example, the system may be of the beacon type as is commonly used with aircraft of this type.

In addition, the standby instrument is capable of displaying on the display unit this departure from the predetermined path that is to be followed.

The pilot sees this departure of the aircraft from the predetermined path that is to be followed. This information constitutes an additional safety element for the pilot, specifically during particular stages of flight, such as the final approach and landing stages.

In an embodiment of the invention, the display unit of the standby instrument provides an identical reproduction of the display of the main display unit. The display unit of the standby instrument may use a man-machine interface identical to that used for the display of the main information system. The pilot thus has a screen identical to the screen the pilot uses normally and can therefore quickly find the information required, in spite of the failure of the main information system.

The present invention also provides a method of operating a standby instrument for an aircraft.

Such an instrument comprises at least one inertial sensor and at least one pressure sensor together with calculation means to which said inertial and pressure sensors are connected. The calculation means also include at least one input suitable for being connected to at least one FADEC and at least one output suitable for being connected to actuators of an autopilot. The standby instrument includes a memory and a display unit connected to the calculation means.

In order to perform the method, the following steps are performed:

measuring flight data by means of the inertial and pressure sensors;

using the calculation means to determine critical flight information, i.e. the forward speed of the aircraft, its altitude, and its attitudes;

displaying this critical flight information on the display unit;

determining stabilization control relationships by means of stabilization relationships incorporated in the memory of the standby instrument;

using the control relationships to control the actuators of the autopilot of the aircraft in the event of said autopilot failing, in order to stabilize the aircraft;

measuring information about the operation of one or more engines of said aircraft and about their environment by means of at least one FADEC;

determining a first utilization limit for the engine(s) together with an available power or torque margin relative to said first utilization limit; and displaying said first utilization limit and said available power or torque margin on the display unit.

In order to determine the first utilization limit of the engine(s) and the corresponding available power or torque margin, at least two variants are possible.

In one variant, the FADEC calculates said first utilization limit and the corresponding available power or torque margin, and then delivers this information to the calculation means.

In another variant, the FADEC delivers the information about the operation of one or more engines of the aircraft and about their environment to the calculation means, and the calculation means then use a dedicated algorithm present in the memory of the standby instrument to determine the first utilization limit and the corresponding available power or torque margin.

In other implementations of the method of the invention, various steps may be incorporated in the method of operating the standby instrument.

For example, the calculation means determine the average values of the angular speeds in roll, in pitching, and in coordinated turning yaw of the aircraft. These average speeds are then used by the calculation means in order to determine said control relationships. In order to perform this calculation, the calculation means use instructions that are present in the memory of the standby instrument.

This additional step serves to reduce the disturbances associated with starting a turn, thereby improving the reactivity with which the aircraft is stabilized.

In another step, a plurality of filter blocks attenuate certain frequencies in the measurements from the inertial and pressure sensors and eliminate external disturbances affecting these measurements. The filter blocks are incorporated in the standby instrument.

An additional step may be using the calculation means to determine a frequency of rotation of the main rotor of the aircraft, and then displaying this frequency of rotation on the display means.

For this purpose, one or more filter blocks isolate the disturbances generated by the rotation of the main rotor of the aircraft. Since these disturbances are associated with the frequency of rotation of the rotor, it is then possible to determine this frequency of rotation of the main rotor.

In another example, the standby instrument is connected to at least one localization device that determines a departure of the aircraft from a predetermined path that the aircraft is to follow, and it displays this departure on the display unit.

The pilot can thus see this departure from the predetermined path that is to be followed. This information constitutes an additional safety element for the pilot, specifically during particular stages of flight such as the final approach and landing stages.

BRIEF DESCRIPTION OF THE SEVERAL VIEWS OF THE DRAWINGS

The invention and its advantages appear in greater detail from the context of the following description of embodiments given by way of illustrations and with reference to the accompanying drawing, in which:

FIG. 1 is a block diagram of the standby instrument of the invention; and

FIG. 2 is the block diagram of an embodiment of the invention.

Elements present in more than one of the figures are given the same references in each of them.

DETAILED DESCRIPTION OF THE INVENTION

FIG. 1 is a block diagram of a standby instrument 10 of the invention. The standby instrument 10 comprises at least one inertial sensor 1 and at least one pressure sensor 2 together with calculation means 3 connected to the inertial and pressure sensors 1 and 2. This standby instrument 10 also includes a display unit 4 and a memory 8.

The calculation means 3 are capable of responding to the measurements from the inertial and pressure sensors 1 and 2 to determine critical flight information for the aircraft, i.e. the forward speed of the aircraft, its altitude, and its attitudes. The calculation means 3 are then capable of displaying such critical flight information on the display unit 4 in the event of a failure of a main information system of the aircraft.

The calculation means 3 have two inputs connected to two FADECs 5 and 5' present in the aircraft. These FADECs 5 and 5' deliver various kinds of information derived from the operation of the aircraft engines and from their environment to a first limitation instrument. This first limitation instrument then provides the pilot with information about a first utilization limit for the engines of the aircraft and about a power margin that is available relative to the first utilization limit.

Via the FADECs 5 and 5', the standby instrument 10 is capable of displaying first utilization limit information about the engines on the display unit in the event of a failure of the first limitation instrument.

The calculation means 3 receive information delivered by the FADECs 5 and 5' about the first utilization limit of the engines and about the available power margin or the torque relative to said first limit, and it displays this information on the display unit 4.

In an embodiment of the invention, FADECs deliver information about the operation of one or more engines of the aircraft and about their environment to the calculation means 3. Thereafter, the calculation means 3 use a dedicated algorithm present in the memory 8 of the standby instrument 10 to determine the first utilization limit and the corresponding available power or torque margin.

In spite of the failure of the main information system, the display unit 4 displays simultaneously critical flight information for the aircraft and the available power or torque margin relative to said first utilization limit of the engines. The pilot can thus continue to maneuver the aircraft in complete safety.

The calculation means 3 of the standby instrument 10 of the invention include an outlet connected to actuators 15 of an autopilot of the aircraft. The calculation means 3 are then capable of controlling the actuators 15 in order to stabilize the aircraft.

By determining the speed of the aircraft and its attitudes, the calculation means 3 of the standby instrument 10 can define control relationships by applying that information to stabilization relationships present in the memory 8 of the standby instrument 10. These control relationships then enable the actuators of the aircraft's autopilot to be controlled directly in the event of the autopilot failing, in order to stabilize the aircraft.

Advantageously, the standby instrument 10 does not have any additional resource for performing this piloting assistance function. The inertial and pressure sensors 1 and 2 and the calculation means 3 are shared between the functions delivering the critical flight information and the information about power margin and the piloting assistance. Thus, adding this piloting assistance function to the standby instrument 10 has no effect whether in terms of cost, or weight, or overall size.

FIG. 2 is a block diagram of an embodiment of the invention.

The standby instrument 10 has three filter blocks, a first filter block 21 for attenuating the effects of the rotation of the main rotor, a second filter block 22 for filtering the resonant modes specific to each of the roll, pitching, and yaw axes, and a third filter block 23 for filtering the angular speeds of each of the roll, pitching, and yaw axes for the purpose of calculating stabilization commands.

These filter blocks comprise various filters such as lowpass filters and notch filters, serving essentially to filter the information coming from the inertial or pressure sensor(s) 1 or 2, e.g. in order to eliminate certain measurement frequencies and attenuate or eliminate the effects of external disturbances on those measurements, such as the vibration generated by rotation of the main rotor of the aircraft.

Furthermore, if at least one of the filter blocks is capable of eliminating the effect of the vibrations generated by the rotation of the main rotor of the aircraft from a given measurement, it is also possible to isolate those vibrations and to make use of them in order to determine the frequency of rotation of the main rotor.

Thus, in another embodiment, the standby instrument 10 enables the frequency of rotation of the main rotor to be determined and then displayed on the display unit 4.

The standby instrument 10 also incorporates configurable software that can be given various settings, and a plurality of settings files that are stored in the memory 8 of the standby instrument 10.

The characteristics of the various filters contained in the filter blocks 21, 22, and 23 need to be adapted to each aircraft on which the standby instrument 10 is installed.

Likewise, although the stabilization relationships are common to each of the aircraft, they include coefficients that depend on the type of aircraft on which the standby instrument 10 is used.

These settings files thus incorporate the coefficients of the stabilization relationships and also the characteristics applicable to the set of filters for each type of aircraft.

By means of the various settings files 8 and the configurable software, the standby instrument 10 can automatically adapt the stabilization relationships and the various filters to the aircraft on which it is installed.

Consequently, a single standby instrument 10 can be used on a variety of aircraft, thereby making it possible to reduce instrument cost in terms of fabrication, maintenance, and managing spare parts.

The standby instrument 10 is also connected to localization means 9 capable of determining the departure of the aircraft from a predetermined path the aircraft should be following.

It is advantageous to provide the pilot with information about that departure from a predetermined path of the aircraft, even in the event of a failure of the main localization system.

The standby instrument 10 can thus display this departure from the predetermined path on the display unit 4.

The pilot thus sees this departure from the predetermined path that is to be followed. This information is an additional safety element for the pilot, especially during particular stages of flight such as final approach and landing stages.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A standby instrument for an aircraft, the instrument comprising:
    at least one inertial sensor;
    at least one pressure sensor;
    calculation means to which said inertial and pressure sensors are connected and suitable for determining critical flight information for said aircraft;
    a memory connected to said calculation means; and
    a display unit capable of displaying said critical flight information in the event of a failure of a main information system of said aircraft;
    wherein the standby instrument incorporates in said memory stabilization relationships enabling said calculation means to determine stabilization control relationships in order to control actuators of an autopilot of said aircraft in the event of said autopilot failing, said calculation means including at least one output suitable for being connected to said actuators, said calculation means also including at least one input suitable for being connected to at least one FADEC engine computer enabling said standby instrument to display information on said display unit about a first utilization limit for one or more engines of the aircraft and about an available power or torque margin relative to said first utilization limit in the event of a failure of the first limitation instrument.

2. An instrument according to claim 1, wherein said calculation unit uses a dedicated algorithm present in said memory and information about the operation of one or more engines of the aircraft and about their environment as delivered by said FADEC engine computer to determine said first utilization limit and said available power or torque margin relative to said first utilization limit.

3. An instrument according to claim 1, wherein said memory includes instructions to enable said calculation means to determine the averages of angular speeds in roll, in pitching, and in coordinated turning yaw of said aircraft.

4. An instrument according to claim 1, wherein said standby instrument incorporates at least one notch filter in order to attenuate the effects of the rotation of at least one main rotor of said aircraft.

5. An instrument according to claim 1, wherein said standby instrument incorporates a plurality of filter blocks, each filter block including at least one filter selected from a list including at least: a notch filter, a lowpass filter, and a filter of configurable structure.

6. An instrument according to claim 1, wherein said standby instrument incorporates three filter blocks, a first filter block for attenuating the effects of the rotation of at least one main rotor of said aircraft, a second filter block for filtering the resonant modes specific to each of the roll, pitching, and yaw axes, and a third filter block for filtering the angular speeds about each of the roll, pitching, and yaw axes in order to calculate stabilization commands.

7. An instrument according to claim 1, wherein said stabilization relationships incorporate coefficients that are a function of the type of aircraft and said filters possess characteristics that are a function of the type of aircraft, and said memory contains configurable software and a file of settings corresponding to each type of aircraft, said calculation means using said configurable software in order to modify said coefficients of said stabilization relationships and said characteristics of said filters.

8. An instrument according to claim 7, wherein said calculation means include two calculation modules, a first calculation module determining said characteristics of said filters making up said filter blocks and said coefficients of said stabilization relationships during a first cycle, and a second calculation module determining said stabilization control relationships for controlling said actuators during each following cycle.

9. An instrument according to claim 1, wherein said calculation means calculate a frequency of rotation of a main rotor of said aircraft and display said frequency of rotation on said display unit.

10. An instrument according to claim 1, wherein said standby instrument is connected to at least one localization device and determines a departure of said aircraft from a predetermined path that is to be followed by said aircraft, said display unit displaying said departure.

11. A method of operating a standby instrument for an aircraft, said standby instrument comprising:
    at least one inertial sensor;
    at least one pressure sensor;
    calculation means to which said inertial and pressure sensors are connected and including at least one input suitable for being connected to at least one FADEC engine computer and at least one output suitable for being connected to actuators of an autopilot;

a memory connected to said calculation means; and
a display unit connected to said calculation means;
wherein the method comprises the following plurality of steps:

measuring flight data by means of said inertial and pressure sensors;

determining critical flight information by means of said calculation means;

displaying said critical flight information on said display unit;

determining stabilization control relationships by means of stabilization relationships incorporated in said memory of said standby instrument;

using said control relationships to control said actuators of said autopilot of said aircraft in the event of said autopilot failing, in order to stabilize said aircraft;

measuring information about the operation of one or more engines of said aircraft and about their environment by means of at least one FADEC engine computer;

determining a first utilization limit of said engine(s) and an available power or torque margin relative to said first utilization limit; and displaying said first utilization limit and said available power or torque margin on said display unit.

12. A method according to claim 11, wherein said memory includes instructions to enable said calculation means to determine averages of angular speeds in roll, in pitching, and in coordinated turning yaw of said aircraft prior to determining said control relationships.

13. A method according to claim 11, wherein said standby instrument includes a plurality of filter blocks for attenuating certain frequencies of said measurements made by said inertial and pressure sensors and for eliminating external disturbances that affect said measurements.

14. A method according to claim 11, wherein said calculation means determine a frequency of rotation of a main rotor of said aircraft and display said frequency rotation on said display unit.

15. A method according to claim 11, wherein said standby instrument displays a departure of said aircraft from a predetermined path on said display unit, said departure being determined by at least one localization device incorporated in said standby instrument.

* * * * *